United States Patent [19]

Simpson

[11] Patent Number: 4,525,848
[45] Date of Patent: Jun. 25, 1985

[54] MANCHESTER DECODER

[75] Inventor: Raymond W. Simpson, Hamilton Square, N.J.

[73] Assignee: Prutec Limited, London, England

[21] Appl. No.: 500,461

[22] Filed: Jun. 2, 1983

[51] Int. Cl.³ .............................................. H03D 3/22
[52] U.S. Cl. ...................................... 375/87; 360/42; 375/104; 328/120
[58] Field of Search ................. 328/72, 120, 133, 134, 328/15 S; 375/81, 82, 87, 104, 110, 119, 120; 307/511, 513, 518, 527; 329/105, 122; 360/42, 51; 331/1 A

[56] References Cited

U.S. PATENT DOCUMENTS

| | | | |
|---|---|---|---|
| 3,102,164 | 8/1963 | Roiz | 375/120 |
| 3,790,892 | 2/1974 | Tan et al. | 328/120 |
| 3,819,853 | 6/1974 | Stein | 375/118 |
| 3,882,412 | 5/1975 | Apple, Jr. | 328/134 |
| 4,191,975 | 3/1980 | White et al. | 375/118 |
| 4,363,002 | 12/1982 | Fuller | 375/87 |
| 4,385,396 | 5/1983 | Norton | 375/120 |

Primary Examiner—Benedict V. Safourek
Attorney, Agent, or Firm—Lewis Messulam

[57] ABSTRACT

A circuit for generating a timing signal in a Manchester decoder comprises an oscillator 10, a frequency divider 14 for dividing signals derived from the oscillator, and a comparator 18 for comparing the times of transitions in the output signal of the divider with transitions in input Manchester data. To form a digital phase locked loop, gates 12 and 16 are provided for selectively adding a pulse to and subtracting a pulse from the pulses applied to the divider 14 by the oscillator 10 in dependence upon the relative timing determined by the comparator 18, in such manner as to lock the phase of the output signal of the divider onto the phase of the Manchester data. A squelch circuit is also provided for inhibiting phase control by the comparator 18 in response to a drop in signal strength of the received signal containing the Manchester data.

4 Claims, 3 Drawing Figures

MANCHESTER DECODER

The present invention relates to a Manchester Decoder.

In Manchester encoded data as used, for example, in cellular ratio, bits are transmitted at a fixed rate and each bit is represented by a transition from one level to another in the middle of the bit. A positive going transition may, for example, indicate a binary one while a negative going transition will indicate a binary zero.

Figure 1:
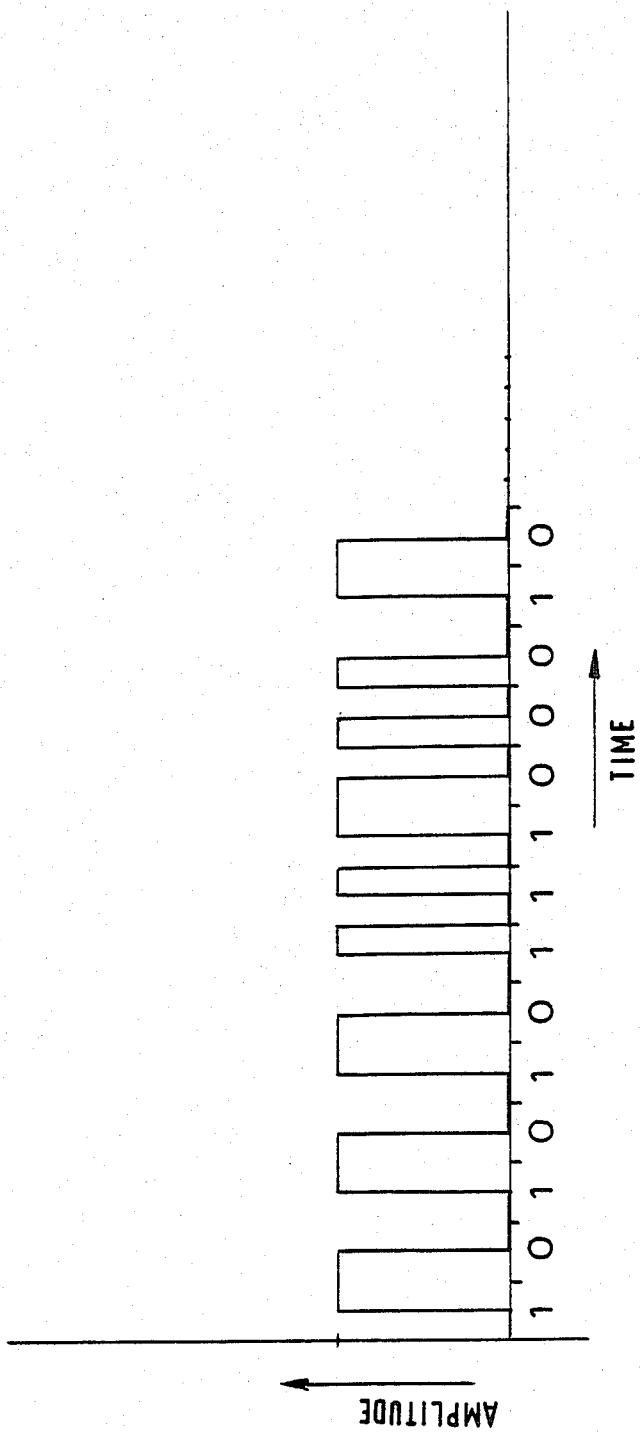

FIG. 1 of the accompanying drawings shows such encoded binary data and the value of each bit is indicated immediately beneath the transition by which it is represented. It will be noted that when a series consists of alternate ones and zeros then all transitions are meaningful and occur at the clock rate. On the other hand, however, when the bits transmitted are all of the same value, then the code consists of a pulse train of twice the bit rate and contains transitions at the beginning of the bits in addition to the meaningful transitions in the middle of the bits. A Manchester Decoder is intended to receive a signal such as that shown in FIG. 1 and to discriminate between the data transitions and the spurious transitions.

Figure 2:
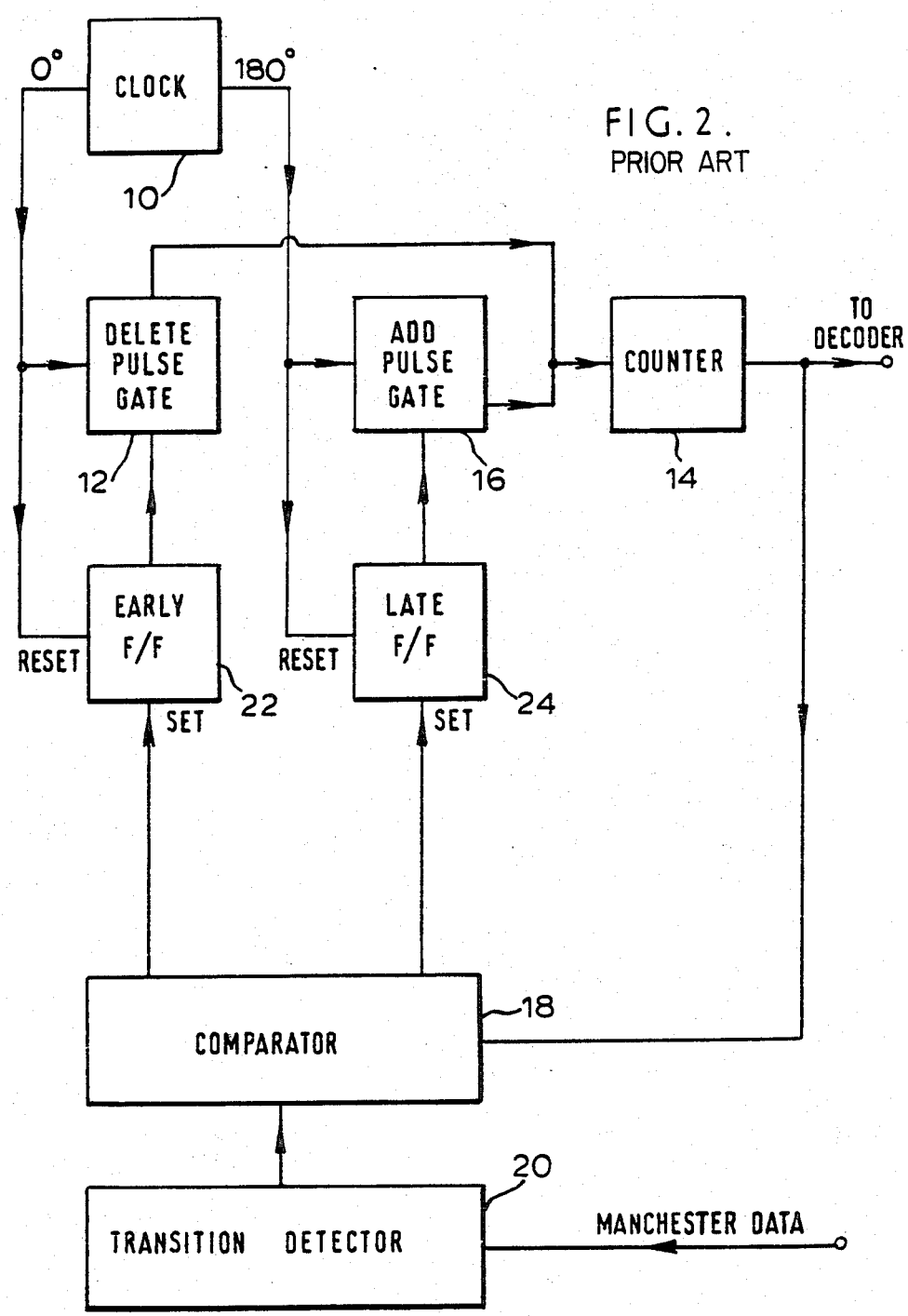

FIG. 2 shows a known digitial circuit for producing a timing signal in the form of a series of pulses at the same frequency as the bit rate of the data signal. A two phase clock 10 has a first output fed by way of a pulse deleting gate 12 to a binary counter constituting a divider 14 and its second output fed to the same divider 14 by way of a pulse adding gate 16. The counter produces an output signal whenever it has received a predetermined number of pulses from the clock 10.

The output of the counter 14 is compared in a time comparator 18 with the transitions of a data signal as detected by a transition decoder 20. If the compared signals are synchronized then neither of the gates 12 and 16 is enabled and the clock frequency is divided precisely by the divider ratio of the counter 14. In the absence of synchronization, depending on whether the transitions of the data signal lead or lag behind the divider output signal, one or other of the gates 12 and 16 is enabled by one of two flip-flops 22, 24 so as to add or subtract a pulse from those reaching the counter. The phase of the divider output signal may thus be corrected to lock it on to the data signal.

With this arrangement, which may be regarded as a digital phase locked loop, it is possible to lock on to the incorrect transitions because, as was earlier described, when a sequence of bits having the same value is transmitted, in addition to the meaningful transitions there are spurious transitions occurring at the same frequency but 180 degrees out of phase with the correct block signals.

In order to ensure that the divided clock signals are locked on to the correct transitions, it is possible to provide two clock trains out of phase with one another and to switch from one to the other when pulses are found to be missing. In this respect, it will be noted that transitions always occur when the clock is in the correct phase but some transitions will be omitted in the other phase if the data contains other than a series of bits of the same value.

A simpler method of achieving synchronization employs a circuit comprising a retriggerable astable multivibrator preceded by a retriggerable monostable multivibrator. The pulses of the data signal are applied to the retriggerable monostable multivibrator which generates a blocking pulse to prevent retriggering of the astable multivibrator. If the monostable multivibrator is locked on to the incorrect phase, there will at some stage be a missing pulse allowing the monostable multivibrator to relax. The next incoming signal will now be permitted to pass on to the astable multivibrator to re-adjust its phase in line with the correct phase transitions.

A problem which occurs in the circuit shown in FIG. 2, and even more so in the above-described circuits which employ multivibrators, is that the synchronization circuit can cause error when operating under conditions of poor signal to noise ratio.

An object in the present invention is to provide a Manchester decoder the synchronization of which is not affected by temporary fading or reduction in signal to noise ratio.

In accordance with the present invention, there is provided a circuit for generating a timing signal in a Manchester decoder, the circuit comprising an oscillator, means for dividing signals derived from the oscillator, comparator means for comparing the times of transitions in the output signal of the divider means with transitions in input Manchester data, and means for selectively adding a pulse to and subtracting a pulse from the pulses applied to the divider means by the oscillator in dependence upon the relative timing determined by the comparator means in such manner as to lock the phase of the output signal of the divider means on to the phase of the Manchester data, characterised in that a squelch circuit is provided for inhibiting phase control by the comparator means in response to a drop in signal strength of the received signal containing the Manchester data.

Figure 3:
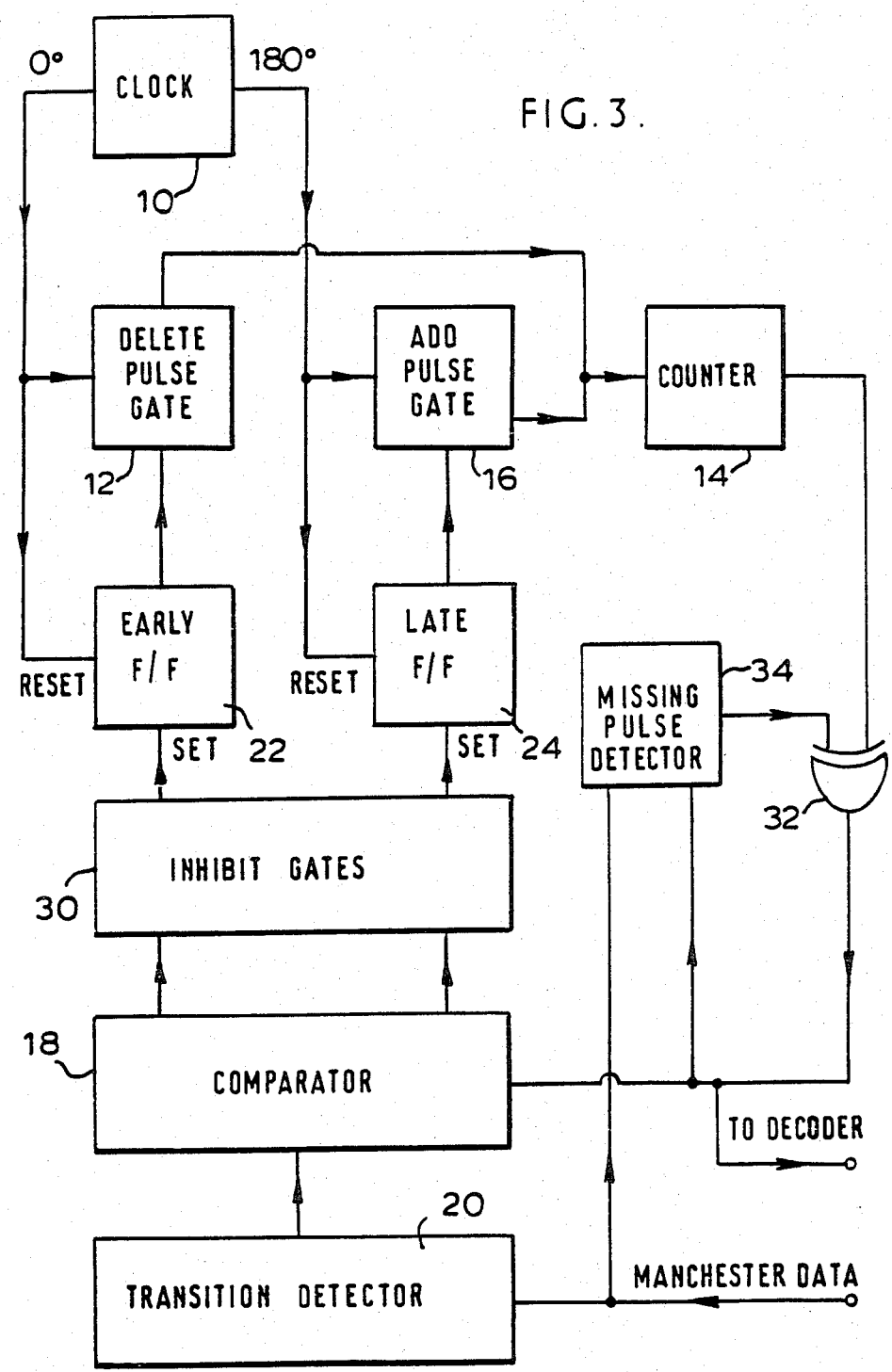

The invention will now be described further, by way of example, with reference to the accompanying drawings, in which:

FIG. 1 is a waveform diagram to illustrate the nature of Manchester encoded data, FIG. 2 is a block diagram of a known circuit for use in decoding a Manchester data signal, and FIG. 3 is a block diagram, generally similar to that of FIG. 2 and showing an embodiment of the present invention.

In FIG. 3, the circuits common to the arrangement shown in FIG. 2 have been allocated the same reference numerals and their operation is the same as earlier described.

In FIG. 3, there are provided inhibiting gates 30 which isolate the output of the comparator 18 from the pulse adding and pulse deleting gates 16 and 12 when the signal to noise ratio is poor. The signal receiver comprises a known squelch circuit (not shown) which detects the signal strength of the received signal and produces an output signal when the signal fades, dropping for example to 80% of its normal level. When operating under conditions of poor signal to noise ratio, data transitions may be absent from the Manchester data signal and spurious noise signals may also be present. These signals would have an effect on synchronization circuits such as that of FIG. 2 which constantly attempt to re-adjust the pulses reaching the counter 14. This tends, in such prior art arrangements, to cause the frequency of the output pulses of counter 14 to drift considerably and causes decoding errors.

It has been found that an improvement may be achieved by preventing any resynchronization during conditions of poor signal to noise ratio, such as might occur on account of temporary fading of the received signal. This, among other things, ensures that when the signal returns to its original strength after temporary fading, the frequency and phase of the timing signal are still sufficiently correct to permit decoding of the Manchester Data, and that no data is lost while the synchronization circuit attempts to correct the drift which occurred under noise conditions.

The circuit of FIG. 3 also differs from that of FIG. 2 in the manner of ensuring that the output of the divider circuit 14 is locked on to the correct transitions in the Manchester Data signal. The digital phase locked loop in the embodiment of FIG. 3 is arranged to produce output pulses of equal mark to space ratio, and the comparator compares the positive going edges only with the detected Manchester data transitions. The output of the counter 14 is applied to the comparator 30 by way of an exclusive-OR gate 32. A missing transition detector 34 also compares the transitions in the signal to the comparator with the Manchester data to determine if any transition is missing from the Manchester data, such a missing transition indicating that the timing signal entering the comparator 18 is out of phase with the Manchester data transitions. When such an out of phase condition is detected, the detector 34 changes the value of the signal at the second input of exclusive-OR gate 32 so that the timing signal is inversion, such invertion being the equivalent to the introduction of a phase shift of 180 degrees.

While the missing transition detector 34 may, as stated above, be a circuit responsive to the absence of a single transition from the Manchester data, it is preferred to arrange for the missing transition detector 34 to be responsive to detection of a predetermined number (N) of missing transitions within a predetermined time interval (T). In this way the detector 34 exerts its influence on exclusive-OR gate 32 to shift the phase of the timing signal only when it detects the absence of N transitions from the Manchester data within a time interval T. Such an arrangement improves the noise immunity of a circuit in accordance with the invention.

I claim:

1. A circuit for generating a timing signal in a decoder of a signal receiver for receiving radio signals carrying Manchester encoded data, the circuit comprising an oscillator, a frequency divider for dividing the frequency of signals derived from the oscillator to generate a divider output signal having transitions therein, a comparator for comparing the times of the transitions in the divider output signal with transitions in Manchester data carried by a signal which, in operation, is received by the receiver, and means for selectively adding a pulse to and subtracting a pulse from the pulses applied to the frequency divider by the oscillator in dependence upon the relative timing determined by the comparator in such manner as to lock the phase of the divider output signal on to the phase of the Manchester data, characterized in that a squelch circuit is provided which detects the strength of the signal received by the receiver and produces an output signal in response to a drop in the detected signal strength, the squelch circuit output signal being effective to inhibit phase control by the comparator.

2. A circuit as claimed in claim 1, wherein the divider output signal is applied to the comparator by way of a selectively operable circuit and means are provided for acting on the inverting circuit to cause phase inversion in response to detection of a missing transition in the Manchester data.

3. A circuit as claimed in claim 1, wherein the divider output signal is applied to the comparator by way of a selectively operable inverting circuit and means are provided for acting on the inverting circuit to cause phase inversion in response to detection of a predetermined number of missing transitions in the Manchester data within a predetermined time interval.

4. A circuit as claimed in claim 1, wherein the squelch circuit is effective to produce the squelch circuit output signal in response to a drop in the detected signal strength to 80% of its normal value.

* * * * *